United States Patent
Franklin et al.

(10) Patent No.: US 7,500,233 B2
(45) Date of Patent: Mar. 3, 2009

(54) PARALLEL FILTER CHECK USING AN ARITHMETIC MEMORY LOCATION

(75) Inventors: Maurice T. Franklin, Woodinville, WA (US); Matthew Jim Lee, Redmond, WA (US); Anthony Frederick Voellm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 11/108,020

(22) Filed: Apr. 14, 2005

(65) Prior Publication Data

US 2006/0248402 A1    Nov. 2, 2006

(51) Int. Cl.
  *G06F 9/45* (2006.01)
(52) U.S. Cl. .................................................. 717/155
(58) Field of Classification Search ............. 717/128, 717/136, 155–156; 708/604, 625–630, 670–672
  See application file for complete search history.

(56) References Cited

U.S. PATENT DOCUMENTS

| | | | | |
|---|---|---|---|---|
| 4,857,882 | A * | 8/1989 | Wagner et al. ............ | 340/146.2 |
| 5,214,599 | A * | 5/1993 | Magerman ................. | 708/650 |
| 5,448,713 | A * | 9/1995 | Hamamoto ................ | 711/154 |
| 5,812,072 | A * | 9/1998 | Masters .................... | 341/55 |
| 6,064,819 | A * | 5/2000 | Franssen et al. ........... | 717/156 |
| 6,292,093 | B1 * | 9/2001 | Su et al. ................... | 340/146.2 |
| 6,317,869 | B1 * | 11/2001 | Adl-Tabatabai et al. ..... | 717/132 |
| 6,735,758 | B1 * | 5/2004 | Berry et al. ............... | 717/130 |
| 6,804,814 | B1 * | 10/2004 | Ayers et al. ............... | 717/135 |
| 6,839,895 | B1 * | 1/2005 | Ju et al. .................... | 717/159 |
| 6,934,935 | B1 * | 8/2005 | Bennett et al. ............. | 717/127 |
| 6,988,120 | B2 * | 1/2006 | Kobayashi et al. ......... | 708/606 |
| 7,003,510 | B2 * | 2/2006 | Andreev et al. ............ | 707/3 |
| 2004/0249873 | A1 * | 12/2004 | Stark et al. ................. | 708/207 |
| 2005/0027776 | A1 * | 2/2005 | Lou .......................... | 708/650 |
| 2005/0177814 | A1 * | 8/2005 | Martlage ................... | 717/102 |

OTHER PUBLICATIONS

Burtscher et al. "Automatic Generation of High-Performance Trace Compressors", Mar. 2005, IEEE Computer Society, pp. 1-12.*
Sias et al. "Accurate and Efficient Predicate Analysis with Binary decision Diagrams", Dec. 2000, ACM, pp. 1-12.*
Holzle et al. "Reconciling Responsiveness with Performance in Pure Object-Oriented Languages", Jul. 1996, ACM, TOPLAS vol. 18, Issue 4, pp. 355-400.*

* cited by examiner

*Primary Examiner*—Wei Y Zhen
*Assistant Examiner*—Anna Deng
(74) *Attorney, Agent, or Firm*—Woodcock Washburn LLP

(57) ABSTRACT

Performing parallel comparisons of variables to determine program code execution flow or to compare multiple variables is disclosed. Memory locations are packed with multiple sub-variables for comparison to sub-variables generated, for example, at runtime. Each binary sub-variable includes a "carryout" bit used to determine whether a comparison of one sub-variable with another sub-variable results in a "true" or a "false." A modified version of twos complement arithmetic is performed on a set of sub-variables. The modified version involves inverting each bit of the sub-variables, performing a masking operation to change the carryout bits to 0, adding a binary 1 to each sub-variable, and performing the masking operation a second time to change the carryout bits to 0. The result of the modified twos complement arithmetic is added to a variable, and the carryout bit of each sub-variable of the resulting variable is evaluated.

19 Claims, 6 Drawing Sheets

5   Let A1=5 and A2= 3
7   Let C1=2 and C2=4

9   Create A=0001100101
11  Create C=0010000010
13  Create D=1000010000
15  Create E=0000100001

17  Compute B = (((~C) & (~D)) + E) & (~D))
19       = ((~0010000010 & 0111101111) + 0000100001) & 0111101111)
21       = ((1101111101 & 0111101111) + 0000100001) & 0111101111)
23       = ((0101101101 + 0000100001) & 0111101111)
25       = 0110001110 & 0111101111
27       = 0110001110

29  Compute the comparison = ((C1 <= A1) && (C1 ! = 0)) | |
31                           ((C2 <= A2) && (C2 ! = 0)) =
33                           ((2 <= 5) && (2 ! = 0)) | |
35                           ((4 <= 3) && (4 ! = 0)) = true 37  Compute the comparison = (A + B) & D
39                           = (0001100101 + 0110001110) & 1000010000
41                           = 0111110011 & 1000010000
43                           = 00000010000 = true

FIG. 3A

5    Let A1=0 and A2=5
7    Let C1=4 and C2=3

9    Create A=0010100000
11   Create C=0001100100
13   Create D=1000010000
15   Create E=0000100001

17   Compute B = (((~C) & (~D)) + E) & (~D))
19           = ((~0001100100 & 0111101111) + 0000100001) & 0111101111)
21           = ((1110011011 & 0111101111) + 0000100001) & 0111101111)
23           = ((0110001011 + 0000100001) & 0111101111)
25           = 0110101100 & 0111101111
27           = 0110101100

29   Compute the comparison = ((C1 <= A1) && (C1 ! = 0)) ||
31                            ((C2 <= A2) && (C2 ! = 0)) =
33                            ((4 <= 0) && (4 ! = 0)) ||
35                            ((3 <= 5) && (3 ! = 0)) = true 37   Compute the comparison = (A + B) & D
39                          = (0010100000 + 0110101100) & 1000010000
41                          = 1001001100 & 1000010000
43                          = 1000000000 = true

FIG. 3B

5   Let A1=4 and A2=3
7   Let C1=0 and C2=5

9   Create A=0001100100
11  Create C=001010000
13  Create D=1000010000
15  Create E=0000100001

17  Compute B = (((~C) & (~D)) + E) & (~D))
19         = ((~001010000 & 0111101111) + 0000100001) & 0111101111)
21         = ((1101011111 & 0111101111) + 0000100001) & 0111101111)
23         = ((0101001111 + 0000100001) & 0111101111)
25         = 0101110000 & 0111101111
27         = 0101100000

29  Compute the comparison = ((C1 <= A1) && (C1 != 0)) ||
31                           ((C2 <= A2) && (C2 != 0)) =
33                           ((0 <= 4) && (0 != 0)) ||
35                           ((5 <= 3) && (5 != 0)) = false 37  Compute the comparison = (A + B) & D
39                         = (0001100100 + 0101100000) & 1000010000
41                         = 0111000100 & 1000010000
43                         = 0000000000 = false

FIG. 3C

PARALLEL FILTER CHECK USING AN ARITHMETIC MEMORY LOCATION

FIELD OF THE INVENTION

The invention generally relates to the field of comparing variables during computer program code execution and particularly to simultaneously comparing plural values.

BACKGROUND OF THE INVENTION

Computers perform comparisons of actual or desired events against preprogrammed or stored events during program code execution. The result of the comparison determines flow of program code execution. Such comparisons are performed, for example, by tracing infrastructure used for debugging computer software. Such infrastructure may provide for simultaneous tracing of components within program code to facilitate debugging. A developer of the program code preprograms potential trace events within the program, and a user later determines the trace events desired for logging. A comparison is performed at runtime, comparing preprogrammed trace events against user-desired trace events. When the comparison results in a match, a trace is performed, and when the comparison does not result in a match, a trace is not performed.

It may be desired to perform multiple comparisons at one time to maximize efficiency, minimize CPU burden, and the like. Such parallel comparisons may be useful when program code allows for execution of multiple components simultaneously. For example, in a tracing infrastructure, it may be desired to complete different types of traces simultaneously. One type of trace may be a performance trace, checking the beginning and ending of functions, timing around operations, or parts of code that have been executed multiple times. Another type of trace may be a diagnostic trace, checking within program code for errors at runtime. A third type of trace may be an administrative or operational trace, an external trace for users and administrators that provides tracing similar to diagnostic traces. Each type of trace additionally may include different "levels." The levels may be inclusive such that each higher level would include all trace levels below it. Therefore, in addition to performing multiple trace types simultaneously, the tracing infrastructure may allow for filtering levels of the traces by comparing developer-configured trace levels with user-desired trace levels. Comparisons at runtime are completed to provide tracing when the configured trace levels and user trace levels overlap and to not provide traces when levels do not overlap.

To perform simultaneous, that is, parallel, comparisons, typical program code for such a tracing infrastructure may look like:

```
If (((userDiagnosticLevel <= configuredDiagnosticLevel) &&
   (userDiagnosticLevel != 0)) ||
     ((userPerformanceLevel <= configuredPerformanceLevel) &&
     (userPerformanceLevel != 0)))
{
  // do the trace
}
```

If a single variable that contains both the diagnostics and performance levels is used, the check might look like:

```
If ((((userLevel & DiagMask) <= (configLevel & DiagMask)) &&
   ((userLevel & DiagMask) !=0)) ||
     (((userLevel & PerfMask) <= (configLevel & PerfMask)) &&
     ((userLevel & PerfMask) != 0)))
{
  // do the trace
}
```

A CPU evaluates the developer-configured and user-desired tracing levels in performing the comparison. First, the CPU would determine if each comparison in the parallel comparison results in a 0, which in the examples above, would be a no-operation (no-op) command. If the comparison results in a 0, then the trace is not performed. If the comparison does not result in a no-op, then the comparison determines if the user levels and the configuration (e.g., developer's) level match or overlap. If there is a match or overlap, then the trace will be performed for the matching level and every level above the matching level.

Writing program code for parallel comparisons using formats similar to the above IF statements would require a greater number of instructions than required for a single comparison. Additionally, more instructions would be required if more comparisons are to be completed simultaneously. That is, for example, if administrative or operation events are also traced, and are thus added in the parallel comparison examples above for diagnostic and performance traces, more instructions may be needed.

One way that a CPU performs the comparison of two variables to determine if a first variable is less than or equal to a second variable involves binary arithmetic. The first and second variables are represented to the CPU as binary numbers. If it is desired to know if X is less than Y, Y can be subtracted from X (i.e., X−Y), and if the result is a negative number, then X is less than Y. Using the example of a trace infrastructure, X may be thought of as the developer's configuration trace level, and Y as the user's desired trace level. It will be recalled that in the example tracing infrastructure, the trace will be performed for the matching level and every level above the matching level. Thus, if a developer's trace level subtracted from a user's trace level results in a sign change (i.e., a negative number), then one would presume a trace should be performed. The following examples show that this logic works some but not all of the time.

In a successful example, if the developer establishes a configuration level for performing a trace at level 3 and a user sets a corresponding trace level at 2, then because 3 minus 2 results in a positive number (i.e., 1), a trace would not be performed, as we would expect. Conversely, if the developer sets the trace level at 2 and a user sets the level at 3, then 2 minus 3 results in a negative number (i.e., −1), and therefore the trace would be performed, as we would expect.

Problems with the logic arise when a level is set at 0. For example, if a developer determines that a diagnostic trace of a particular function should never be performed, and thus sets the configuration level for the diagnostic trace at 0 (i.e., a no-op), and a user sets the configuration trace level at 4, then a subtraction results in a sign change, as 0 minus 4 is a negative number (i.e., −4). Because the developer determined that no diagnostic traces on the particular function should be performed, though, this result could lead to an incorrect result or an error.

It is understood that the problems herein described are not limited to tracing infrastructure and that there are similar problems associated with other comparison functions that would benefit from parallel comparisons. For example, parallel comparisons may be used in database systems where multiple operators check a user-provided input and select items from a database based on comparison of the input to a predetermined value.

Therefore, there is a need for systems and methods for performing parallel comparisons taking into account the manner in which a CPU performs arithmetic and without requiring a great increase in program code instructions.

SUMMARY OF THE INVENTION

The invention provides systems and methods for performing parallel comparisons of variables to determine program code execution flow without requiring a great increase in program code instruction. The invention includes packing a memory location with multiple sub-variables for comparison to sub-variables generated, for example, at runtime. The sub-variables are in binary form and include bits representing the value of the sub-variable and a sign bit representing the sign (i.e., positive or negative) of the sub-variable. Additionally, each sub-variable includes a "carryout" bit. The carryout bit is used to determine whether a comparison of one sub-variable with another sub-variable results in a "true" or a "false" and thus the carryout bit facilitates the comparison of each sub-variable at the memory location. The carryout bit is also used to separate the sub-variables in the memory location to prevent a sub-variable from affecting an adjacent sub-variable.

The systems and methods disclosed herein include performing a modified version of a binary arithmetic method called twos complement arithmetic. The modified version may be performed on sub-variables at the time that the values of the sub-variables are known. For example, if a developer establishes tracing levels when writing program code, then the modified version can be applied to the configured sub-variables and the result can be stored in memory for use later in comparisons. The modified version involves inverting each bit of the sub-variables, performing a masking operation on the carryout bit to change it back to 0, adding a binary 1 to each sub-variable, and performing the masking operation a second time to change the carryout bit to 0. The result of this calculation may be stored in a separate memory location for use in future comparisons. Alternatively, this calculation may be performed on the fly.

At the time of comparing sub-variables, the resulting sub-variables of the modified version calculation are added to respective sub-variables to perform the comparison. A binary AND function may be performed on the sum to determine the value of the carryout bit for each sub-variable. If a carryout bit is a 1, for example, then the comparison results in a "true" and if it is a 0, then the result is false.

BRIEF DESCRIPTION OF THE DRAWINGS

FIGS. 3A-3C depict example comparisons of sub-variable pairs according to the invention.

DETAILED DESCRIPTION OF ILLUSTRATIVE EMBODIMENTS

Example Computing Environment

Figure 1:
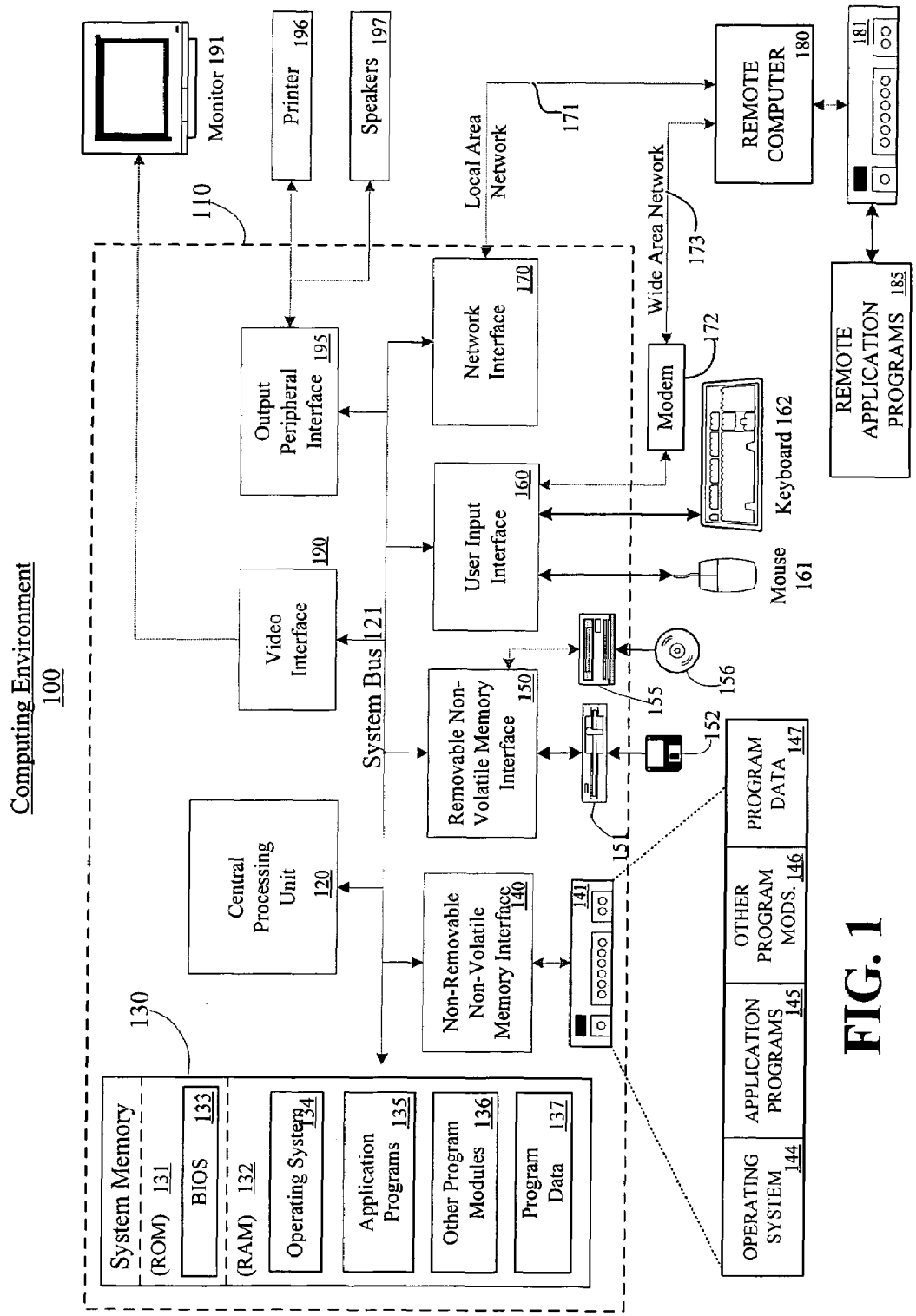
FIG. 1 is a block diagram showing an example computing environment in which aspects of the invention may be implemented.

FIG. 1 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor. The term "binary" refers to a representation of an integer in a base two form, with each "bit" in the representation comprising a 1 or a 0. The term "carryout bit" refers to a bit in a binary number that represents either a true or a false when comparing two integers. The term "binary AND" refers to a function for comparing respective bits of two binary numbers. When both respective bits are 1, the result of the binary AND for the bits is "true," and otherwise, the result is "false." The term "variable" refers to a variable or, alternatively, refers to a memory location, and the term "sub-variable" refers to a variable within a variable or packed with other sub-variables in a memory location.

While a general purpose computer is described below, this is merely one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 2A:
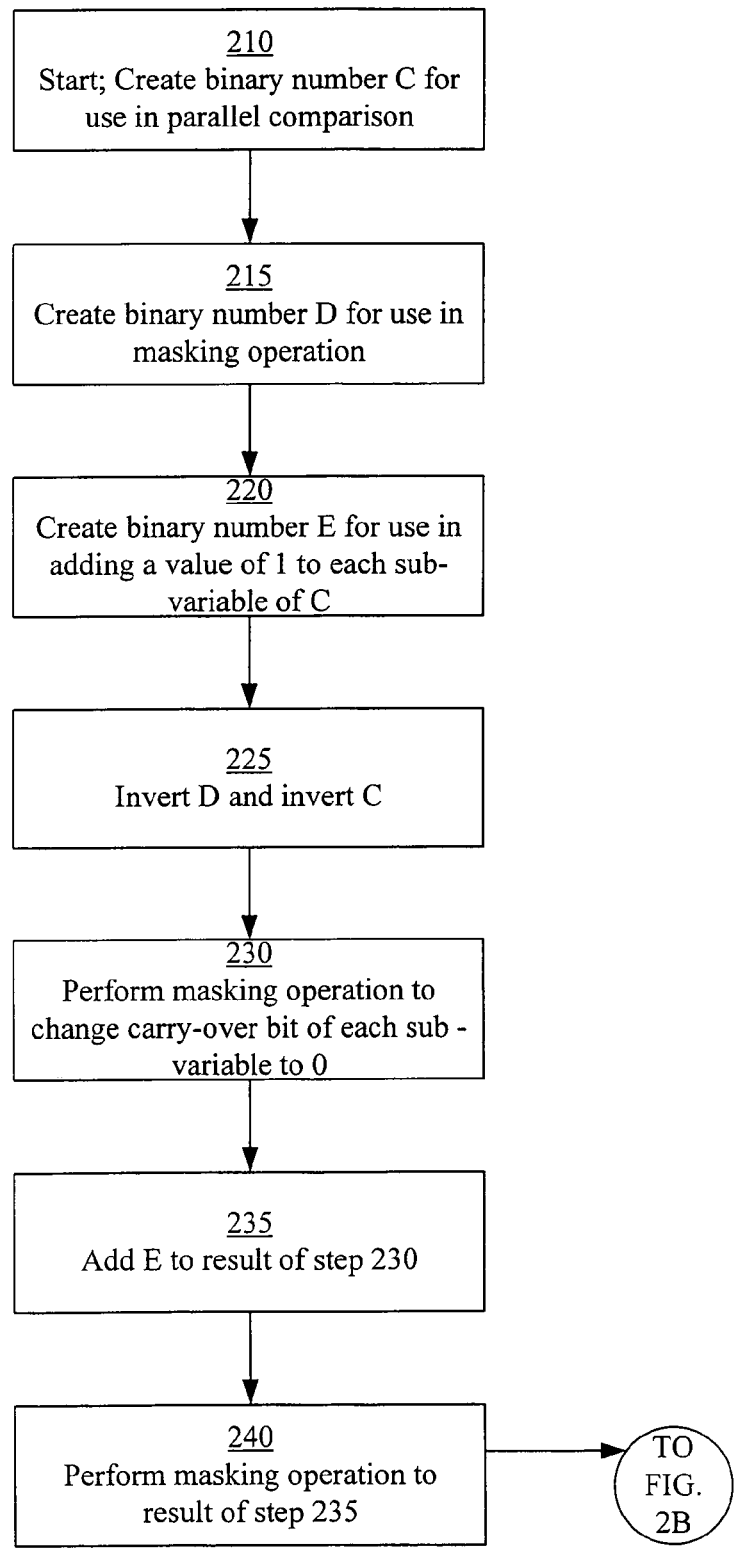
FIGS. 2A-2B depict an example method for performing parallel comparisons using an arithmetic memory location, according to the invention.
Figure 2B:
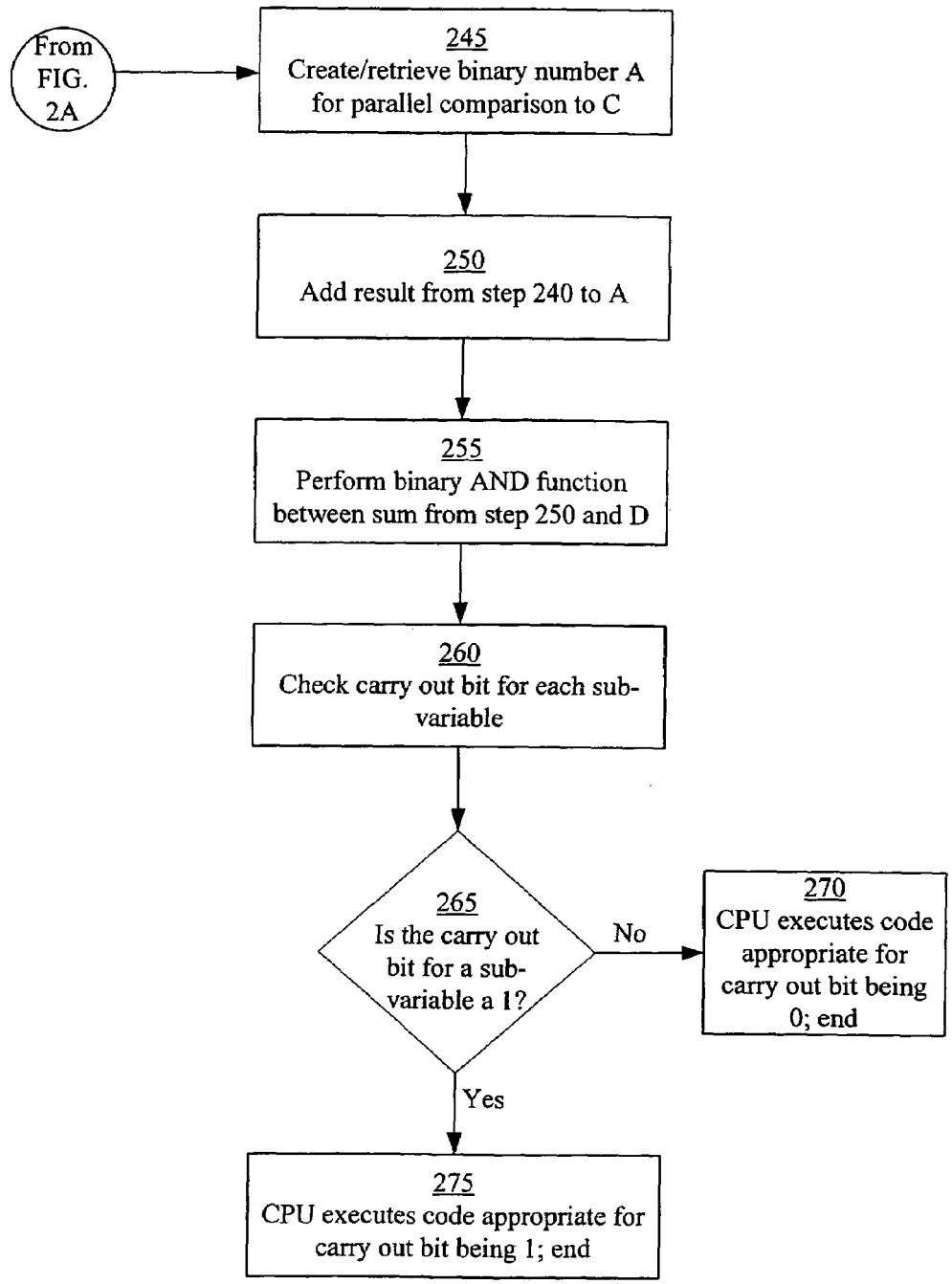

FIGS. 2A-2B depict an example method 200 for performing parallel comparisons using an arithmetic memory location, according to the invention. The method 200 may be performed on the computer 110 described with regard to FIG. 1. The method 200 is used, for example, to compare a variable A to a variable C to determine if C is greater than A. The variables A and C may each include plural sub-variables, and therefore, the comparison set out by the method 200 compares respective sub-variables in parallel and simultaneously.

Steps 210 through 240 involve manipulations to the sub-variables of variable C so that, after conclusion of step 240, the result of the manipulations can be used to perform the comparison. In this way, steps 210 through 240 may be completed ahead of time, before, for example, the comparisons with the sub-variables of variable A are to be made. For example, variable C may include sub-variables representing diagnostic and performance trace levels established by a program code developer when developing program code. The variable C may thus represent trace levels against which trace levels chosen by a user are compared. The trace levels chosen by the user would be the sub-variables of variable A. At the time of establishing a value for the sub-variables of variable C, the manipulations of steps 210-240 may be completed and the results stored in memory. In this way, the manipulations will not need to be created on the fly, and the stored results may be used for multiple comparisons. Alternatively, steps 210-240, or some of the steps, may be completed on the fly, at run or compile time.

The method 200 performs a computation that is a modified version of twos complement arithmetic. Twos complement arithmetic generally provides a way of subtracting a first binary number from a second binary number. In twos complement arithmetic, the first binary number is inverted, 1 is added to the inverted number, and then the inverted number is added to the second binary number. The sum is a value that equals the difference between the first and second binary numbers. For example, 3 minus 2 would be, in binary terms, 011 minus 010. It will be understood that 3 could be written as binary 11 and 2 could be written as binary 10, each without a preceding 0, and that the preceding 0 is the sign bit, indicating whether the value is negative or positive. Performing twos complement arithmetic, 010 (the integer 2) is inverted to obtain 101. The value 1 (i.e., 001) is added to 101, resulting in 110. Adding 011 (the integer 3) to 110 results in 001, or the integer 1. Thus, 3 minus 2 is 1.

As noted, the binary representation of the integers may include a sign bit. In accordance with the invention, the binary representation of the integers also includes a carryout bit. When the carryout bit at the conclusion of the comparison is 1, then the operation for which the comparison is performed is carried out. When the carryout bit is 0, the operation is not carried out. Of course, it is understood, that other implementations may reverse the meaning of the 0 and 1 for the carryout bit, providing that when the bit is 0, an operation is performed and when it is 1, the operation is not performed. Therefore, continuing the 3 minus 2 example, the integer 3 is binary 0011, with the first or left-most bit being the carryout bit and the next 0 being the sign bit. Likewise, the integer 2 would be represented as binary 0010.

The carryout bit performs a second function in addition to indicating whether an operation is to be performed. The carryout bit also provides a separation of binary numbers, allowing such numbers to be packed together in the allowed bits per memory location while preventing the numbers from interacting with each other. For example, the variable C may include a sub-variable C1 for a diagnostic trace level, and a sub-variable C2 for a performance trace level. The variable C, therefore, may be represented as C1C2. The variable C1 may be 2 and the variable C2 may be 3. The variable C, in binary terms with carryout and sign bits, would be 00100011.

Taking into account the carryout and sign bits associated with each variable, the invention provides for a floor of N/3 sub-variables to be compared simultaneously, where N is the number of bits in a memory location storing the variables. Additionally, a value of 0 in any of the sub-variables means not to do the check and return false for the comparison. Thus, the following comparisons are performed simultaneously through the method 200 for each sub-variable pair $(A_j, C_j)$:

```
If ((Aj == 0) || (Cj == 0))
{
    return false;
}
else if (Cj <= Aj)
{
    return true;
}
else // Cj > Aj
{
    return false;
}
```

Each sub-variable pair $(A_j, C_j)$ is packed such that each variable is allowed to consume M bits, where M is at least 3. Because the method 200 does not require all variables to be the same size, $M_j$ indicates the number of bits used for each sub-variable pair. The numbers represented are in the range $[0, (2^{M_j-2}-1)]$ inclusive, and the number of sub-variable pairs to compute simultaneously is k. The two extra bits are the sign and carryout bits. The sub-variable pairs are packed in a separate memory location like A0A1...Ak and C0C1...Ck. The actual filter operation does not use C but rather uses memory location B and stored as B0B1...Bk, where:

$$B_j = (((\sim C_j) \& (\sim D_j)) + E_j) \& (\sim D_j)$$

Steps 210-240 manipulate the variable C to calculate the variable B. Similar to the twos complement arithmetic, the variable B is added to the variable A to provide the final comparison of the variables C and A. The constant D is Dj=2(Mj−1) and is stored as D1 D2 . . . Dk. The constant D is used as a masking function within the method 200, to set the carryout bit to 0 during the performance of certain steps of the method, and then to determine whether the result of the comparison results in a true or false. Constant E is Ej=1 and is stored as E1 E2 . . . Ek, and is used to add 1 to the sub-variables of the variable C during execution of the method 200.

The method commences at step 210 by creating binary numbers for the sub-variables of C and packing them into variable C. The constants D and E are created at steps 215, 220. At step 225, variable C and constant D are inverted. The inversion converts each bit having a value of 0 to a bit having a value of 1, and converts each bit having a value to 1 to a bit having a value of 0. At step 230, the inverted constant D and the inverted variable C are combined using a binary AND function. Thus each bit of the inverted variable C, except for the carryout bits, retains its value when combined with the inverted D. The carryout bit of each sub-variable, however, is set to 0 if the inversion of variable C resulted in it becoming 1. Thus in step 230, inverted constant D performs a masking operation to mask the carryout bit of each sub-variable, changing each to 0.

At step 235, the result of the application of the binary AND function is added to the constant D. The constant D adds a value of 1 to each sub-variable of the variable C, similar to twos complement arithmetic. The masking operation similar to step 230 is performed at step 240 by combining, using the binary AND function, the result of step 235 with the inverted constant D. As with step 230, the masking operation at step 240 converts each carryout bit to 0 if step 235 resulted in it being 1 but leaves unaffected the value bits and the sign bits of the variable C. Thus, upon completion of step 240, stored in Bi is a modified twos complement of Ci with the carryout bit set to 0.

The comparison logic described above therefore becomes:

```
If ((A + B) & D) != 0)
{
   Return true;
}
else
{
   Return false;
}
```

The steps 245-275 of the method 200 complete the comparison of variable C to variable A. At step 245, variable A is created or, if it is already created, retrieved. Variable A includes sub-variables A1, A2 . . . Ak, and each sub-variable is to be compared to respective sub-variables C1, C2, . . . Ck of the variable C. The variable B, which results at the completion of step 240, is added to the variable A at step 250. At step 255, a binary AND function is performed to combine the result of step 250 with the constant D to determine the value of the carryout bit. At step 260, the carryout bit for each sub-variable of the variable resulting from the completion of step 255 is checked. If, at step 265, the carryout bit for a sub-variable within the variable is a 0, then the CPU will execute code appropriate for that outcome at step 270. Consistent with the tracing example used herein, this would mean a trace would not be performed. If the value of the carryout bit for any sub-variable is 1, then the CPU would execute program code appropriate for such an outcome at step 275. With regard to the tracing example, a trace would be performed.

In one embodiment of the invention, the values for B and D are precomputed and used with different values of A at runtime. In an alternative embodiment, B and D are computed on the fly. It is understood that Aj minus Cj becomes negative when Cj is greater than Aj and thereby causes a carryout bit value to become 1 in the example herein described. A carryout bit value of 1, however, is not created when Aj is 0 but is created when Aj equals Cj.

FIGS. 3A-3C depict example comparisons of variable pairs (Aj,Cj) according to the invention. In the examples depicted in FIGS. 3A-3C, the maximum value of any variable is 7 so that the number of bits needed to represent the variables will be 5, that is, three bits for variable values, one bit for the sign of the value (positive or negative) and one bit for the carryout. It is understood that the invention may be implemented in systems having available more bits to represent the variable values.

In FIG. 3A, at line 5, the variables A1 and A2 are set to respective values of 5 and 3. The binary form of A1 thus is 00101 and of A2 is 00011. At line 7, the variables C1 and C2 are set to 2 (binary 00010) and 4 (binary 00100) respectively. The value of variable A shown at line 9 is A2A1 or binary 0001100101. The value of variable C is C2C1 or binary 0010000010, shown in line 11. Line 13 shows the constant D, used to perform the masking function. Constant E is also created and is used as the additive 1, similar to the twos complement method. That is, as explained herein, to perform twos complement arithmetic, a number is inverted and added to 1. The constant E shown in line 15 is the 1 to which the inverted number is added.

Line 17 shows the modified twos complement arithmetic computation according to the invention and explained with regard to steps 210-240 of the method 200. Lines 19 through 27 show the calculation for the value B. At line 19, the inverse of the constant D is obtained to be used as the masking function for the carryout bits. At line 21, the inverse of the variable C is obtained and masked at line 23 to convert the carryout bits of the sub-variables of C to 0. At line 25, the constant E is added to the inverse of variable C. Finally, at line 27, the resultant of line 25 is masked again, using the inverted constant D.

Lines 29-35 show a comparison indicating the expected outcome from a comparison of C1 and C2 to, respectively, A1 and A2. At lines 33-35, the comparison results in a true because 2 is less than 5 and not equal to 0. Lines 37-43 show, as explained with regard to steps 245-260 of the method 200, the comparison using the inventive method of adding the variable A to the variable B and performing a binary AND function to combine the sum of the variables A and B with the constant D. The result is a true, consistent with expectations from the comparison of lines 29-35.

FIG. 3B shows an example implementation of the inventive method where the value of A1 is 0. As in FIG. 3A, lines 5-15 create the values for the variables A and C and the constants D and E. Lines 17-27 show the calculation for the value of variable B. Again, calculating B involves performing a binary AND between the inverse of variable C and the inverse of constant D, adding the result to constant E, and then performing a masking operation to change the carryout bits to 0.

Lines 29-35 show a comparison of A1 and A2 to C1 and C2, respectively, showing the result expected using the example inventive method. The result of the comparison is true, as shown in line 35. Lines 37-39 show the comparison by adding A to B and performing a binary AND with D. The result, shown in line 43, likewise is true.

FIG. 3C shows a third example implementation of the inventive method, where the value of C1 is 0. Lines 5-15 create the values for variables A and C and constants D and E. Lines 17-27 show the calculation for the value of variable B, similar to the FIGS. 3A and 3B. Lines 29-35 show a comparison of the sub-variables A1 and A2 to the sub-variables C1 and C2, respectively, and show that the comparison using the inventive method should result in a false. Lines 37-43 show that using the inventive method, when the variables A and B are added and the sum is used in a binary AND with the constant D, the result is likewise false.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of the invention, as described in FIGS. 2A-2B and 3A-3C and as claimed, constitute a computer system that embodies the present invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer-implemented method for determining program execution flow by comparing a first sub-variable that is part of a first variable with a second sub-variable that is part of a second variable, the method comprising:
   creating a first binary representation of the first variable resulting in the first variable comprising binary bits, wherein the first sub-variable comprises a first binary carryout bit;
   creating a second binary representation of the second variable resulting in the second variable comprising binary bits, wherein the second sub-variable comprises a second binary carryout bit;
   creating a masking constant and an additive constant;
   inverting each bit of the first sub-variable and the masking constant;
   combining the inverted masking constant with the inverted first variable to produce a first result;
   adding the additive constant to the first result to produce a second result;
   combining the second result with the inverted masking constant to produce a third variable, wherein the first binary carryout bit is converted to 0 if the adding of the additive constant to the first result caused the first binary carryout bit to become 1;
   adding the third variable to the second variable to produce a fourth result;
   determining a value of a third binary carryout bit associated with the fourth result by combining the fourth result with the masking constant; and
   determining whether to perform an operation based on the value of the third binary carryout bit.

2. The computer-implemented method of claim 1, wherein adding the additive constant to the first result results in a value of 1 being added to the first sub-variable.

3. The computer-implemented method of claim 1, wherein the third variable is a modified twos complement of the first variable with the first binary carryover bit set to 0.

4. The computer-implemented method of claim 1, wherein combining the fourth result with the masking constant masks each bit associated with the fourth result except for the third binary carryout bit.

5. The computer-implemented method of claim 1, further comprising:
   storing the third variable.

6. The computer-implemented method of claim 2, wherein the first variable further comprises a third sub-variable having a fourth binary carryout bit, and
   wherein each step of the method is applied to the third sub-variable simultaneous to application to the first sub-variable, resulting in the fourth binary carryout bit having a 0 value.

7. The computer-implemented method of claim 6, wherein the second variable includes a third sub-variable having a fourth binary carryout bit,
   adding the third variable to the second sub-variable of the second variable, and, simultaneously, adding the third variable to the third sub-variable of the second variable.

8. The computer-implemented method of claim 1, wherein the first sub-variable represents a trace level established in program code, and wherein the second sub-variable represents a trace level established by a user of the program code.

9. A computer-storage medium having program code stored thereon that, when executed by a computer system, determines program execution flow by comparing a first sub-variable that is part of a first variable with a second sub-variable that is part of a second variable, the program code including instructions that cause the computer system to:
   create a first binary representation of the first variable resulting in the first variable comprising binary bits, wherein the first sub-variable comprises a first binary carryout bit;
   create a second binary representation of the second variable resulting in the second variable comprising binary bits, wherein the second sub-variable comprises a second binary carryout bit;
   create a masking constant and an additive constant;
   invert each bit of the first sub-variable and the masking constant;
   combine the inverted masking constant with the inverted first variable to produce a first result;
   add the additive constant to the first result to produce a second result;
   combine the second result with the inverted masking constant to produce a third variable, wherein the first binary carryout bit is converted to 0 if the adding of the additive constant to the first result caused the first binary carryout bit to become 1;

add the third variable to the second variable to produce a fourth result;

determine a value of a third binary carryout bit associated with the fourth result by combining the fourth result with the masking constant; and determining whether to perform an operation based on the value of the third binary carryout bit.

10. The computer-storage medium of claim 9, wherein adding the additive constant to the first result results in a value of 1 being added to the first sub-variable.

11. The computer-storage medium of claim 9, wherein combining the fourth result with the masking constant masks each bit associated with the fourth result except for the third carryout bit.

12. The computer- storage medium of claim 10, having further program code stored thereon that, when executed by the computer system, causes the computer system to:
store the third variable.

13. The computer-storage medium of claim 9, wherein the first sub-variable represents a trace level established in program code, and wherein the second-sub-variable represents a trace level established by a user of the program code.

14. A computer system configured to determine program execution flow by comparing a first sub-variable that is part of a first variable with a second sub-variable that is part of a second variable, the computer system comprising:

means for creating a first binary representation of the first variable resulting in the first variable comprising binary bits, wherein the first sub-variable comprises a first binary carryout bit;

means for creating a second binary representation of the second variable resulting in the second variable comprising binary bits, wherein the second sub-variable comprises a second binary carryout bit;

means for creating a masking constant and an additive constant;

means for inverting each bit of the first sub-variable and the masking constant;

means for combining the inverted masking constant with the inverted first variable to produce a first result;

means for adding the additive constant to the first result to produce a second result;

combining the second result with the inverted masking constant to produce a third variable, wherein the first binary carryout bit is converted to 0 if the adding of the additive constant to the first result caused the first binary carryout bit to become 1;

means for adding the third variable to the second variable to produce a fourth result;

means for determining a value of a third binary carryout bit associated with the fourth result by combining the fourth result with the masking constant; and means for determining whether to perform an operation based on the value of the third binary carryout bit.

15. The computer system of claim 14, wherein adding the additive constant to the first result results in a value of 1 being added to the first sub-variable.

16. The computer system of claim 14, wherein combining the fourth result with the masking constant masks each bit associated with the fourth result except for the third binary carryout bit.

17. The computer system of claim 15, further comprising: means for storing the third variable.

18. The computer-readable medium of claim 9, wherein the third variable is a modified twos complement of the first variable with the first binary carryover bit set to 0.

19. The computer system of claim 14, wherein the third variable is a modified twos complement of the first variable with the first binary carryover bit set to 0.

* * * * *